United States Patent Office 3,514,338
Patented May 26, 1970

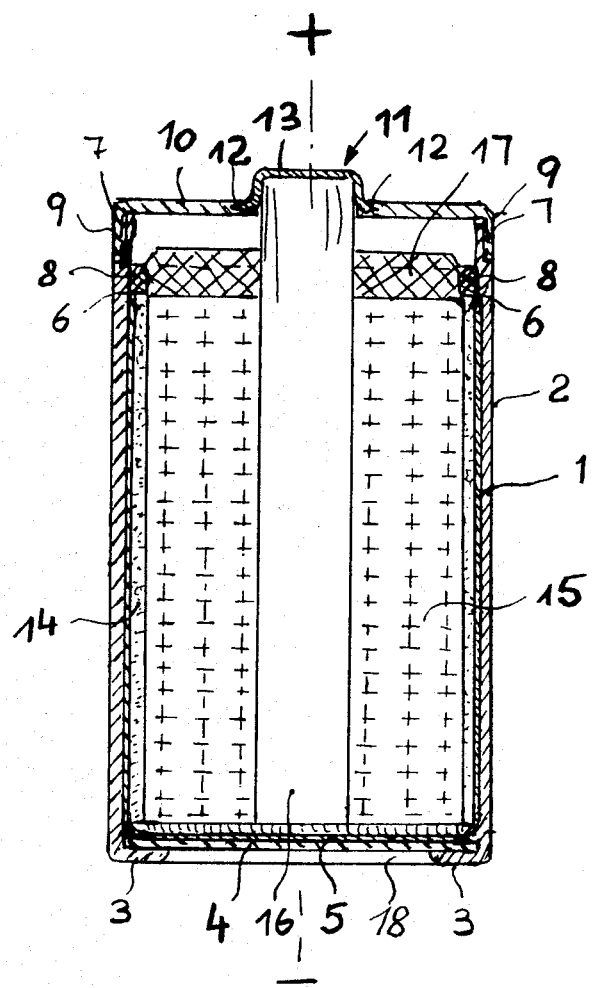

3,514,338
ELECTRICAL PRIMARY ELEMENT
Korneliske Shakour, nee Eekma, 14 Hubertusstrasse,
8000 Munich, Germany
Filed Apr. 12, 1968, Ser. No. 720,898
Int. Cl. H01m 17/00
U.S. Cl. 136—102                          5 Claims

ABSTRACT OF THE DISCLOSURE

The invention relates to a primary cell having a cup-like zinc negative electrode.

The cell casing has a transparent portion and an indicator for water is viewable through same.

---

This invention relates generally to an electrical primary element consisting of a cup-like zinc electrode providing the negative pole of said element and being covered on the outside with a transparent plastic covering and contains in its inner space a depolarizer mass made active by adding a liquid, a current loading carbon rod provides the positive pole of said element extending axially along the center line of said cup-like electrode, said cup-like electrode being covered on its inner cylindrical surface with a porous separator layer, and refers especially to such an electrical primary element which is activated by adding a liquid to its elements before use.

Such known elements are generally filled completely with an electrolytic liquid during production. But in these elements an electro-chemical reaction takes place without delivering current therefore the life of such elements would be limited.

In other known electrical primary elements so named dry elements, means are provided for adding a liquid immediately before use. The life of such elements would be unlimited before adding a liquid but there would be many difficulties encountered in obtaining proper possibilities for filling in the liquid and having a completely tight cover for the element after filling-in the liquid to avoid leaking of liquid electrolyte. Therefore such known primary elements use means for filling in liquids required for activation and sealing the element thereafter. These means can be a removable contact cap, or small tubes molded in the sealing materials covering the open end of the cup-like electrode. These elements are difficult to handle when filling in the liquid through these small openings and there are no possibilities of controlling the filling rate of the liquid. Also, there is the danger that atmospheric humidity entering the element before use through said openings not completely air-tightly sealed, therefore causing premature activation of the elements.

To secure a fully closed primary element to be activated immediately before its use it is known for a cup-like zinc electrode to be enclosed in a transparent container which has a built-in reservoir containing the liquid necessary for activation. The liquid then can be dispersed from the reservoir into the element for activation. Many of these elements have dimensions larger than normally required for a given output of current. Furthermore not only do they need special expenditures in production for the special reservoir containing the liquid to be dispersed into the element they also cannot replace known elements or batteries with the same output of current.

It is the object of this invention to provide such an electrical primary element having means for filling in a liquid thus activating said element.

Further it is the object of this invention to provide such an element which has means for adding an activating liquid and having means for detecting whether or not liquid has already been added and whether or not said elements would have been activated.

Another object of this invention would be to provide such an element with means for filling in said liquid in the open end of said cup-like electrode and said transparent plastic cover being tightly molded with said cup-like electrode on its cylindrical circumferential outer surface and the outer marginal screwable lid on the open end of said transparent covering, an electrically leading contact cap filling tightly in the central opening in said lid and protrudes with its top part on the outside of said lid in such a manner that the outer free end of the current leading carbon rod extending to above the open end of said cup-like electrode fits in and makes contact with the inner surface of said contact cap after having screwed said lid on said transparent covering, whereby, the free edge on the open end of said transparent covering existing over the open end of said cup-like zinc electrode providing a transparent blank circumferential area of said covering between the free edge of said electrode and said lid threaded on said cover and an indicator ring-line strip reacting to the added liquid for activating said depolariser material which is arranged inside of said transparent blank circumferential area.

Another object of this invention would be to provide such an electrical primary element in which the cup-like zinc element can be sealed completely without danger of the electrolytic liquid leaking out of the element from the bottom part of said cup-like zinc electrode covered with a separate metal contact plate which is secured on said bottom by welding, brazing or equivalent and the marginal area of said transparent covering embracing tightly the outer margin of said metal contact plate.

Still a further object of this invention would be to provide such an element with means by which the user can fill the exact volume of activating liquid by using the inside of said lid as a measuring device for activating said depolarizer mass said lid to be screwed onto the threaded upper end of the transparent covering thus closing and sealing the element.

Still a further object of this invention would be to provide such an element with means for a quick uniform dispersion of an activating liquid in the entire inner space of said cup-like zinc electrode by adding in the inner space of said cup-like zinc electrode a non-ionogen neutral wetting agent, said wetting agent being provided for on the outer surface of said depolarizer material.

Further objects and advantages of this invention may be understood best by reference to the following descriptions taken in connection with the accompanied drawing which shows an axial section of an electrical primary element monocell relating and belonging to this invention.

The cup-like electrode being an open ended zinc container has its outer surface tightly molded into a plastic covering 2. This covering 2 consists of a transparent plastic material which envelopes the cylindrical outer surface and the marginal area around and partly underneath the bottom and the border 3 of a metal contact plate 4 being welded, brazed or fastened in other manners with said bottom. With the molding of the plastic container around the zinc electrode for example through the method of injection molding, part of the plastic material penetrates between the edges of the metal contact plate 4 and the bottom 5 of the zinc electrode and therefore the bottom contact plate is fully enclosed and sealed in said plastic covering 2. This tight sealing remains secure even if the zinc electrode disintegrates completely.

The free upper edge 6 of the zinc electrode 1 ends a short distance beneath the threaded edge 7 on the free upper margin of said covering 2 leaving a transparent blank circumferential area in this plastic covering 2 an indicator stripe 8 is then arranged inside of said blank transparent area around the cell said indicator stripe for example consisting of a paper stripe treated with an indicator dye material, pigment and/or chemical impregnation.

On the thread 7 of the threaded margin section 9 of the transparent covering a lid 10 made of plastic material is screwed on closing and sealing said cell. A central opening in the lid 10 would be closed with a contact cap 11 consisting of an electrically leading material molded tightly with the border edge 12, the top part 13 of said cap protrudes from the upper part of the lid 10 and forms the positive contact of the element. The inside of the zinc electrode is covered with a porous separator 14 which has been impregnated with water soluble electrolytic salts and the neutral, non-ionogen wetting agent preferably being selected from the group containing Na-alkylphenylensulphonato or alkylnaphthalinsulphonate. Surrounded by the zinc electrode, and the layer of porous material (separator) the depolarizer mass 15 is filled in, and has running through its center a carbon rod acting as a current leading electrode. The carbon rod fits and makes contact with its upper end in the inner space of the cup-like contact cap 11. Therefore, in other words, the other end of the carbon rod 16 preferably as known covered with a metal cap which presses against the inner face of the contact cap molded in the lid when screwed on to close the element therefore assuring a good contact.

The height of the border 9 of the lid 10 can be modified to give a correct measurement of the liquid volume necessary to activate the element, or, a part of this volume, so it can be used as a measuring device.

The upper surface of the depolarizer mass 15 would be covered with a screen-like disc 17 which not only assures accurate dispersion of the activating liquid over the element but furthermore prevents the falling out of the depolarizer material when the lid 10 is unscrewed possibly caused due to vibration during transportation. The free space inside the border 3 of the bottom metal contact plate 4 serves as the negative pole of the element.

I claim:
1. An electrical primary cell comprising:
   (a) a cup-like zinc negative electrode having an upper open end,
   (b) a non-conductive casing surrounding said cup-like electrode and extending above said opening, said casing having a detachable cover for closing said open end of said cup-like electrode, said cover having a conductive terminal, and said casing having a transparent portion above said open end of said cup-like electrode,
   (c) a carbon electrode disposed within said cup-like electrode and separated therefrom by a depolarizer and positioned to conductively engage the terminal of said cover,
   (d) water soluble electrolytic salts disposed within said cup-like electrode, and
   (e) indicator means disposed within said casing and viewable through said transparent casing portion for indicating by color change the presence of water in said cell.
2. A water-activated primary cell comprising:
   (a) a cup-shaped zinc electrode having a top edge defining an open upper end,
   (b) a depolarizer and water-soluble electrolytic salts disposed within said cup,
   (c) a carbon electrode disposed in the midst of the depolarizer,
   (d) a plastic casing with a screw top surrounding at least the sides and open end of the cup, said casing having a transparent portion above the top edge of the cup, said screw top having a terminal for said carbon electrode, and
   (e) indicator means disposed within the casing adjacent said transparent portion for indicating by color change when the cell has been activated by introducing water therein.
3. The invention of claim 2 wherein said indicator means comprises a strip of material covered with a cobalt-chloride mixture.
4. The invention of claim 3, wherein said cell also includes a screen-like disc at the top of the cup for preventing the outflow of the depolarizer and for equalizing distribution of water when the top is removed.
5. The invention of claim 2 wherein the water-soluble electrolytic salts are impregnated in a porous separator material disposed adjacent the inner wall of said cup, and wherein said separator material is also impregnated with a neutral, non-ionogen wetting agent selected from the group containing Na-alkylphenylensulphonate or alkylnaphthalinsulphonate for increasing the rate of dispersion by the water when it is introduced in the cell.

References Cited

UNITED STATES PATENTS

| | | | |
|---|---|---|---|
| 665,679 | 1/1901 | Hall | 136—182.02 |
| 1,132,846 | 3/1915 | Holzapfel | 136—169.2 |
| 1,497,388 | 6/1924 | Sterling | 136—182.02 |
| 2,801,276 | 7/1957 | Toce et al. | 136—166 |
| 3,016,414 | 1/1962 | Priebe | 136—107 |
| 3,046,786 | 7/1962 | Tessem | 136—182 |
| 3,275,477 | 9/1966 | Schmid-Wildy | 136—107 |
| 3,288,650 | 11/1966 | Reilly et al. | 136—107 |
| 3,382,107 | 5/1968 | Hennigan | 136—166 |
| 3,399,284 | 8/1968 | Morison | 136—182 |

WINSTON A. DOUGLAS, Primary Examiner

C. L. LE FEVOUR, Assistant Examiner

U.S. Cl. X.R.

136—182